United States Patent [19]

Hendrixson et al.

[11] 4,103,456
[45] Aug. 1, 1978

[54] DEVICE AND METHOD FOR TREATING TREES

[76] Inventors: Dale Z. Hendrixson, 340 Summit Rd.; John C. Macbeth, 224 Summit Rd., both of Springfield, Pa. 19064

[21] Appl. No.: 711,983

[22] Filed: Aug. 5, 1976

[51] Int. Cl.² .......................................... A01G 29/00
[52] U.S. Cl. ................................................. 47/57.5
[58] Field of Search ..................................... 47/57.5

[56] References Cited

U.S. PATENT DOCUMENTS

| | | | |
|---|---|---|---|
| 1,756,453 | 4/1930 | Davey et al. | 47/57.5 |
| 2,334,556 | 11/1943 | Howard et al. | 47/57.5 X |
| 2,677,639 | 5/1954 | Howard et al. | 47/57.5 X |
| 3,130,519 | 4/1964 | Mauget | 47/57.5 |
| 3,295,254 | 1/1967 | Schoonman | 47/57.5 |
| 3,832,803 | 9/1974 | Blake et al. | 47/57.5 |
| 3,834,075 | 9/1974 | Nix et al. | 47/57.5 X |
| 3,968,594 | 7/1976 | Kawakami | 47/57.5 X |

*Primary Examiner*—Robert E. Bagwill
*Attorney, Agent, or Firm*—C. W. Mortenson

[57] ABSTRACT

The apparatus of this invention is an element that has at one end the means for attaching to that end a pressurized vessel containing the material which is to be used in treating a tree and at the other end outlets for the said material which outlets are correlated to be positioned right at certain prepared exposed areas of the tree into which the material is to be directed. In between the two ends there is a valve means that is in conduit relationship with the passageway between the two said ends.

7 Claims, 6 Drawing Figures

U.S. Patent  Aug. 1, 1978  Sheet 1 of 2  4,103,456
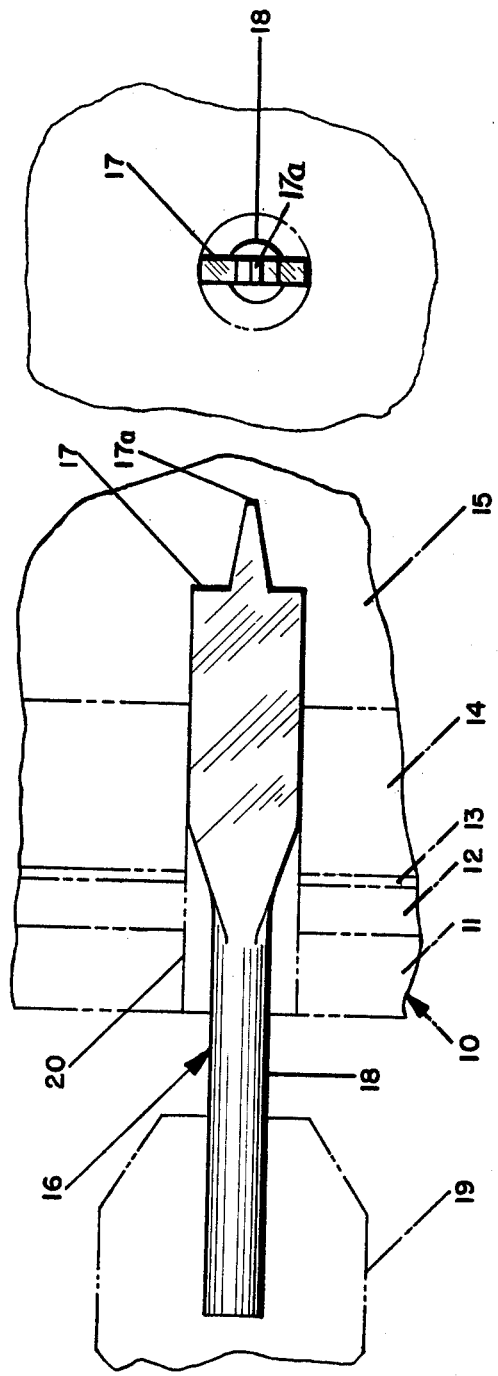
FIG. 1
FIG. 2
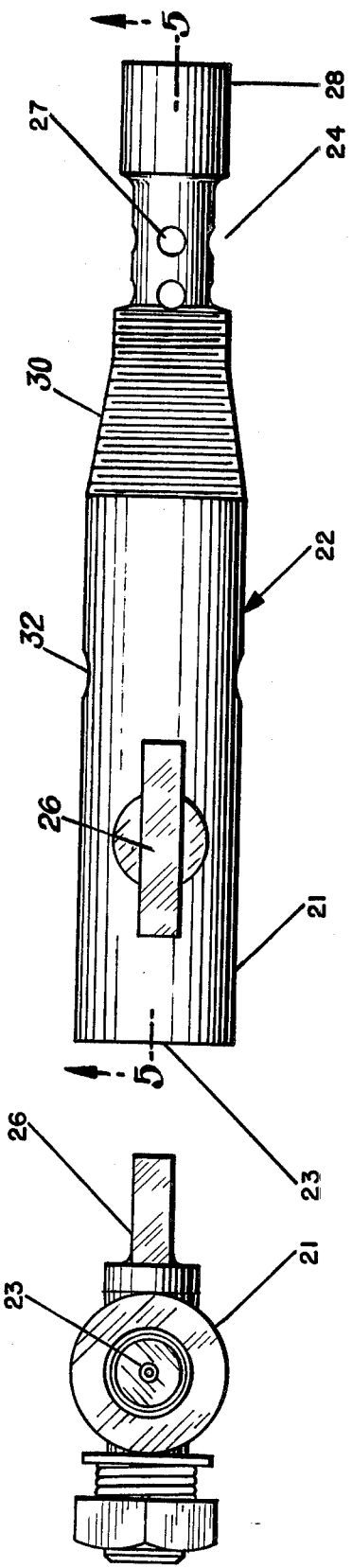
FIG. 4
FIG. 3

DEVICE AND METHOD FOR TREATING TREES

THE PROCESS IN BRIEF

In practicing the invention the person who is to apply the said materials to the said tree first drills a hole into the tree using a steel drill of predetermined length. The length of the drill is generally fixed, having been based upon the average thickness of various parts of elm trees to which the apparatus and the method of this invention are particularly directed. Of course, in similar injections for other trees the user will drill the initial hole taking into account the thickness of the various parts of the particular tree he is treating. Using the drill described herein, the user drills four holes circumferentially around the tree in about 90 degree increments at about four feet from the ground. Drilling is continued until the chuck bottoms against the bark, and the drill is then removed. The pressurized can is then attached or threaded onto the inlet portion of the apparatus of this invention with the valve in the closed position. At the inlet end is an element which pierces the can and is in conduit relationship with said valve. With the pressurized vessel in position and with the valve closed the user then inserts the assembly into one of the holes.

Prior to opening the valve, the user turns the assembly until threads on a tapered section of the apparatus of this invention snugly fit and engage the hole. He then opens the valve, and if there is slight leakage he then tightens the assembly by rotating to engage the threads with the bark of the tree in sealing relationship therewith. Sealing may also be effected at the bark edges by use of gums or wadding materials hand-applied so that threaded section 30a can be replaced by a smooth walled section, if desired. After about 15 minutes the valve is turned off and the assembly is removed. Such a period of time is usually ample for the pressurized vessel to be emptied of its contents.

The contents are normally liquid solutions of chemicals specifically chosen to assist the tree and these contents pass through the valve into the conduits of the outlet of the assembly and, due to the pressure and due to the porosity of the various parts of the tree, the liquid goes into the exposed parts and is absorbed by the tree. The user can treat all the other three holes in the same manner at the same time using a plurality of the devices of this invention, or he can remove the emptied pressurized vessel from the injector after finishing one of the several holes he has drilled in the one tree, then attach another and pass on to the next hole. The apparatus and method described above is particularly useful for treating American elm trees for Dutch Elm Disease. However, the same apparatus and method can be used to inject nutriments into trees and the fungicides can be modified with additives for treating other diseased trees such as maples, oak and the like.

BACKGROUND OF THE INVENTION

The pressure injection of chemicals into living trees is a technique that is coming more and more into use as a way of combating various wilt diseases and the insect borers that attack trees. A number of systemic fungicides have been made available, such as methyl 2-benzimidazolecarbamate phosphate, benomyl and benlate. However, the apparatus and processes involved to date for the injection of such materials into a tree has involved cumbersome apparatus and excessive time. Further, the fertilization of trees in cities is often virtually impossible because of the many interfering elements such as concrete and hard surfaces of roads and nearby sidewalks, the presence of underground telephone and other lines and the presence of nearby lawns which the homeowner does not wish to have disturbed. Also, the expense of treating a given tree has been hithertofore very substantial. Thus, apparatus and methods for a "Do-It-Yourself" operation has been sorely needed.

Thus, one aim of this invention is to provide an injection apparatus which is inexpensive and easy to use. Another purpose is the provision of a boring tool which allows the homeowner to drill a hole into a tree that is no larger and no longer than is really necessary to accomplish the pressurized injection of fluid into the tree. Still another objective is the provision of a pressurized system which can be used in the horizontal position with assurance that all of the liquid under pressure in the pressurized container is emptied. Another goal is the provision of a simple package containing a plurality of pressurized injection devices to afford simultaneous treatments, thus allowing the user to treat a given tree in as short a time as possible. These and other objectives appear hereinafter.

The novel features that are considered characteristic of this invention are set forth with particularity in the appended claims. The invention, itself, however, both as to its organization and method of operation, as well as additional objects and advantages thereof, will be best understood from the following description when read in connection with the accompanying drawings, in which:

FIG. 1 is a side elevation of the drilling tool shown having bored a hole in a tree being treated, the tree and the chuck holding the drill being shown using broken and phantom lines;

FIG. 2 is an end elevation of the device shown in FIG. 1 still positioned in the tree;

FIG. 3 is a left end elevation of the injection tool shown in FIG. 4;

FIG. 4 is a side elevation of the said tool of this invention;

Figure 5:
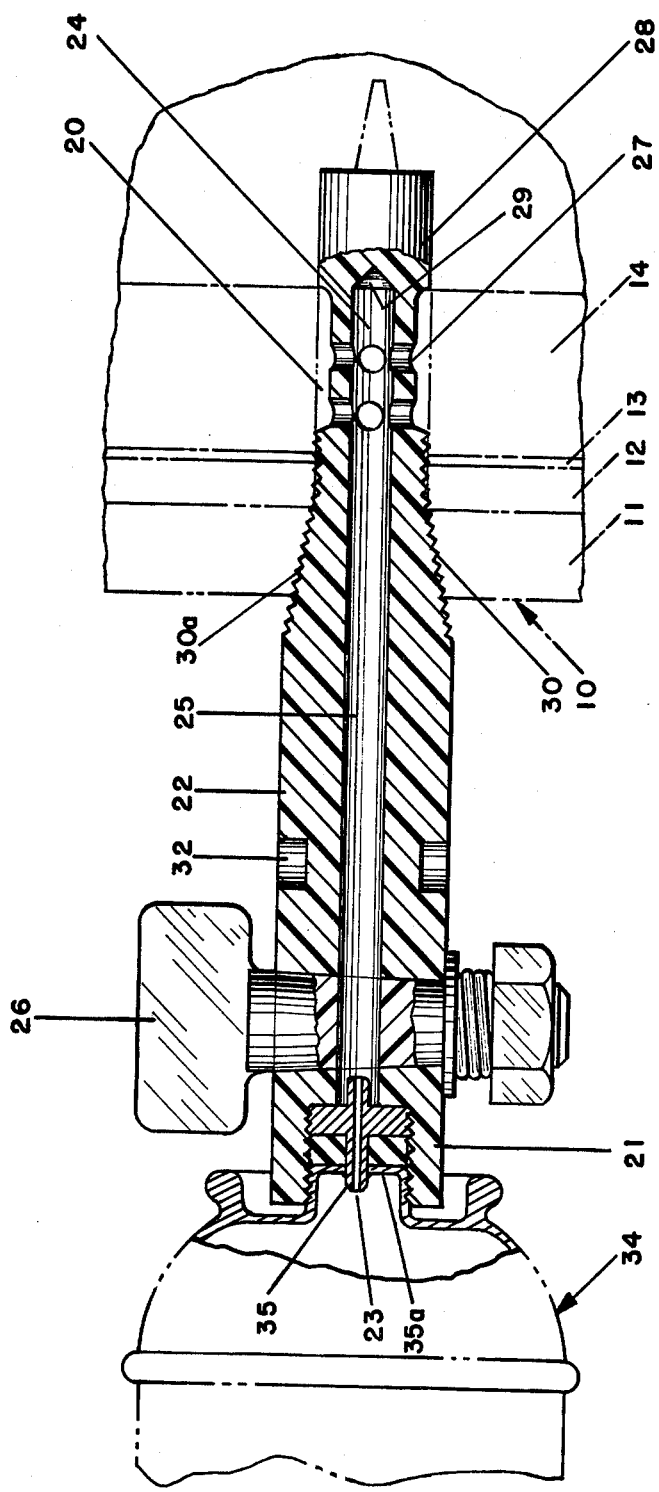
FIG. 5 is a cross-sectional view taken along line 5—5 of FIG. 4 and showing a container attached to it.

As shown in FIG. 1 the tree 10 is sectionalized to indicate the bark 11, the inner bark or phloem 12, the cambium cell layer 13, the sapwood 14 and the heartwood 15. As previously explained, the fungicide or the materials to be injected into the tree are preferably injected into the sapwood 14. In order to effect a proper drilling of a hole into the tree of the proper length an ordinary steel drill 16 is provided of a predetermined length. This length is based on the average thickness of the various parts of elm trees and the length provided affords one access to the heartwood under average conditions. The steel drill 16 has a configuration on its drilling end as shown in FIG. 2. In other words, it is an ordinary, unserrated cutting edge 17 which on rotation actually removes the wood parts of the tree forming a hole rather than forming a core. The steel drill is pointed at one end (point 17a) and has a shaft 18 to which is attached an ordinary chuck 19. Since the distance into which the drill is going to go into the tree is relatively short, and the hole is relatively small, the chuck that is used to effect the necessary rotation can be hand operated or it can be part of an electric drill. In any event, the drilling is terminated when the cutting edge 17 has gone in as far as the chuck 19 will permit. The shaft 18 can be calibrated to allow the user to position the chuck at a given point on the shaft to allow for various lengths, but usually this is not necessary, because it is only necessary to drill until one gets to the heartwood. Thus, the drilling apparatus usually affords only one setting of the chuck, a hole of about 2-3 inches in length being generally more than is needed to expose the sapwood for the coming injection. Usually a hole depth of 2.5 inches is effected to assure the desired exposure. When the chuck 19 is snug against the outer bark, the drilling equipment is removed leaving a hole 20 in the tree.

Into this boring is inserted the injection device of this invention 21 which is shown in FIGS. 3, 4 and 5. This device comprises an elongated element 22 having an inlet end 23 and an outlet end 24, a bore or conduit (FIG. 5) running from the inlet end to the outlet end and in between the two said ends in passageway relationship with the said bore 25 is valve means 26. At the outlet end 24 there are located passageways 27 which are positioned in the device so that when the device is inserted into the hole 20 in the tree at least one of these passageways 27 will be within the sapwood section 14. The outlet end 24 comprises a solid section 28 to afford stability of mounting of the device of this invention in the hole 20 in the tree. Also, at the outlet end, the inner bore 25 which runs from the inlet end to the outlet end terminates with a solid closing 29. It is near this closing end that the passage ways 27 are located in a series similar to that shown in FIGS. 4 or 5.

Also shown in FIG. 5 is the pressurized element or can 34 which has been threaded on or otherwise mounted to device 21 until piercing, hollow needle 35 has pierced the seal in the threaded section 35a of the can.

Figure 6:
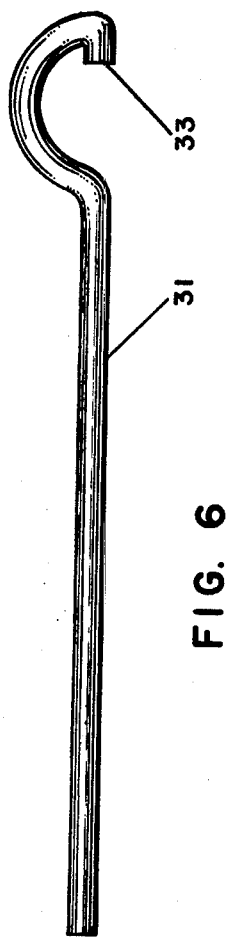
FIG. 6 is a side elevation of a spanner wrench for positioning the device of FIG. 4 in sealing relationship with the tree being treated.

With the device of this invention in position in the tree 10 as shown in FIG. 5, there is a possibility that any liquid forced out of passageways 27 when valve 26 is opened would leak past the inner bark or phloem and past the outer bark. This is so because the outer bark is generally a spongy, resilient material. In order to prevent such leakage, the device of this invention is provided with the tapered section 30 which has serrated edges 30a. The operator then uses the spanner wrench 31 shown in FIG. 6 to grip the device of this invention at notches 32 which are adapted to accept the nobs 33 of wrench 31. Using this lever, the operator can tighten up, forcing the device of this invention further and further into the hole so that the inner bark and the outer bark are in effect being drilled by the turning of the device. This forms a very snug fit between the serrated edges 30a of device 21 and the inner 12 and outer 11 bark as shown in FIG. 5. By this means the problem of leakage is avoided.

When the injection device of this invention is solidly in position and the leakage problems have been obviated, the operator, having attached the aerosol can 34 so that its seal has been punctured by the needle or piercing pin 35, and having opened the valve 26, allows the can to vent its contents into the injection means of this invention. The operator allows the valve to be in the open position as long as needed to allow all of the pressurized fluid within the can to flow through the conduit 25 into passageways 27. Since the device is positioned so that there is no doubt that at least one of the passageways 27 is in the sapwood section, the operator can let the device remain in the position shown until the entire content of the container 34, such as an aerosol can, has been expelled and forced into the porous sapwood or inner bark. While that is occuring, he may, of course, be effecting an additional drilling using the drill shown in FIG. 1. Normally, four such drillings and four such injections are applied to a given tree at about the same level. The four are generally spaced equi-distant from each other. One of these operations is accomplished within a matter of about 5 to 8 minutes. Thus, using a plurality of injectors the operator can effectively treat a tree in thirty minutes or less.

As is well known, the sapwood, the cambium cell layer and the inner bark are pipelines for hormones, food material, water and the like to the living tree. With the provision of a plurality of openings 27 at the outlet end of the injection device of this invention, access of the nutrient or fungicide coming from can 34 to one or more and generally all of these three pipeline parts of the tree is assured. These pipelines in the tree are extremely effective through capillary action and absorption and adsorption phenomena. Thus, there is no need in the use of the apparatus and the method of this invention to depend on gravity for the flow of material throughout the tree. The effectiveness of the apparatus and method of this invention can readily be shown by the inclusion of a dye in the pressurized contents. Upon injection of such a colored material the dye can be observed in the upper parts of the tree and in the leaves within a matter of a few hours after the injection has been completed. The injected material finds its way into the smallest twigs, branches, and leaves of the tree very quickly.

The Dutch Elm Disease is caused by a fungus that literally chokes the tree to death, preventing water and other nutrients from getting to the growing parts of the tree. To combat the fungus any of a number of effective fungicides can be used in the pressurized container of this invention. One such fungicide known as benomyl which chemically is methyl 1-(butylcarbamoyl)-2-benzimidazolecarbamate. Another fungicide is known as benlate. Still another is "LIGNASAN" BLP (a trademark of E. I. duPont de Nemours & Co., Inc., the product having EPA Reg. No. 352-379-AA) which is a water soluble liquid mixture of inert materials (about 99.3%) and methyl 2-benzimidazolecarbamate phosphate (about 0.7%). This liquid mixture may be used as commercially available, but preferably it is diluted by adding water, as, for example, in ¼, ⅛, 1/12 dilutions or more. These materials are toxic to the fungus that causes Dutch Elm Disease which fungus is known as *Ceratocystis ulmi*. A homeowner or an arborist on checking elm trees can readily spot the disease since it begins with a branch or a few in the top of the tree that carries leaves showing yellow and then rapidly becoming dried up and brown. Upon peeling the bark of such a branch back, one finds brown patches or streaks. By using the principles of this invention an integral control can be effective for the elm bark beatle, which carries the disease, as well as the fungus can be eliminated. It is of course to be appreciated that the contents of the pressurized aersol can be as desired by the user. For example, the user may wish to inject into a growing tree hormones, herbicides, fertilizers, growth regulators and such other chemicals. The apparatus and the methods of this invention are not limited to the treatment of diseased trees or trees that may become diseased but apply also to plant studies, research projects and the like.

After the user has completely finished the treatment of a given tree, he can, of course, apply a sealant to the hole such as a wound-balm or in such other proper manner he can close each of the holes that has been drilled into the tree to prevent damage therethrough.

It is also to be appreciated that container 34 may be any convenient vessel attachable to the device 21 of this invention. It need not be pressurized, since the gravity flow can be effected, as, for example, by having the container elevated above the device and connected to it by a hose. Pressurized vessels, however, are preferred. For example, the container may be equipped with a valve means to receive a pump such as a small hand pump or conventional bicycle pump or water pressure by means of a garden hose. Of the pressure systems used, an aerosol or can having expandable containers therein or piston types can be used. The "SEPRO" can available commercially from the Continental Can Co. is preferred. Such containers are described in U.S. Pat. Nos. 3,467,283; 3,471,059; 3,549,058; 3,828,977; and 3,718,234. These vessels are generally metal walled and contain a plastic, compressible container within the outer metallic or rigid vessel. The two converge at the outlet end where they are capped to effect sealing. The cap is readily punctured to open the vessel, and upon puncture, a low-boiling expandable material, such as a low-boiling halogenated lower alkane, expands forcing the plastic container to contract, thus forcing the material within the plastic container to be expelled, the puncturing of the cap being directly into the plastic container. The puncturing device can be element 23 as described. Since a number of containers, such as "SEPRO" cans are not threaded at the outlet end, the device 21 need not be threaded at 35 as shown in the drawing, but may have smooth walls, snug fittings being effected between the outlet end of the can and the inlet end of device 21.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

What is claimed is:

1. Apparatus for use in injecting a fluid into a boring made in a tree for the purpose of treating said tree with said fluid which is fed into said apparatus from a vessel and through said apparatus into said boring, which apparatus comprises a unitary device comprising:

an injector element containing therein a tube affording a passageway for said fluid through said element, said tube having an inlet and an outlet for said fluid;

said inlet being adapted to being attached directly to said vessel;

said outlet comprising a plurality of apertures in conduit relationship with said tube;

contiguous with said plurality of apertures and positioned on said unitary device between said apertures and said inlet of said tube a tapered, threaded element affording a sealing means with the bark of said tree, thereby to avoid leakage of said fluid out of said boring;

contiguous with said plurality of apertures and at the furthermost position from the inlet a solid element positionable in the innermost end of said boring, thereby affording stability to the mounting of said apparatus in said boring; the apertured outlet portion of said element being of a reduced width with respect to the threaded and solid elements on either end thereof, and positioned on said apparatus between said tapered, threaded element and said inlet, a valve in closing and opening relationship with said tube.

2. A device in accordance with claim 1 which includes means to rotate said device to effect insertion into said tree in sealing relationship with its bark.

3. Apparatus in accordance with claim 2 which contains notches in the outer surface of said unitary device adaptable to accept the gripping elements of said rotating element, said insertion affording a snug fit between said tapered, threaded element and said bark and effecting said sealing.

4. A unitary device in accordance with claim 1 which includes a means for breaking the seal of said vessel in the event it is sealed which means is positioned on said device at its inlet end and is adapted to bring said vessel into conduit relationship with said tube in said injector element.

5. A device in accordance with claim 1 in combination with a pressurized vessel of fluid.

6. A device in accordance with claim 5 in which said pressurized vessel contains means for ejecting from said vessel fluid held in said vessel when said vessel is in the horizontal position.

7. Apparatus in accordance with claim 1 in which said plurality of apertures are arranged in a series so that at least one of said apertures is in conduit relationship with the cambium cell layer of said tree.

* * * * *